J. ZWEIGHAFT & L. NAUMAN.
FEED BAG SUPPORT.
APPLICATION FILED DEC. 7, 1914.
1,168,043.
Patented Jan. 11, 1916.
2 SHEETS—SHEET 1.
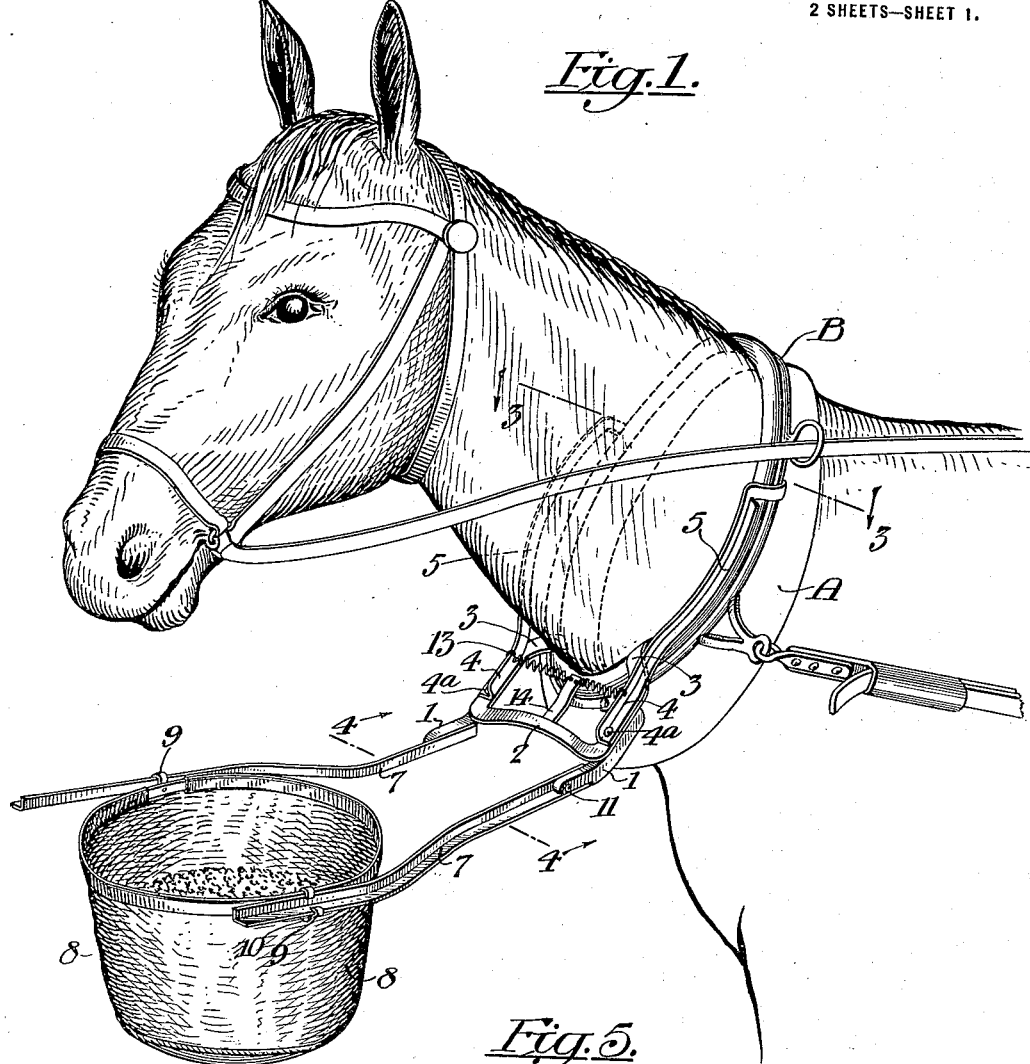
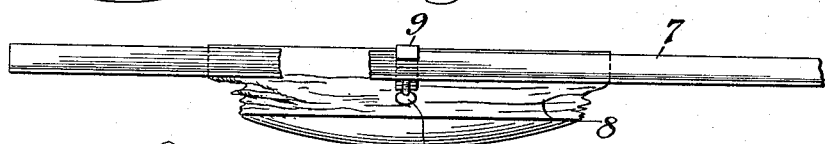
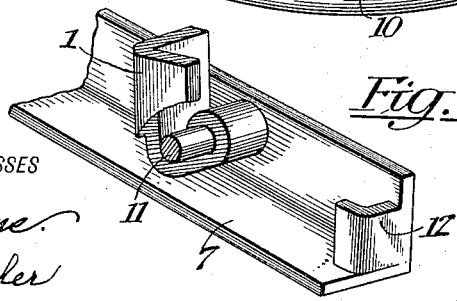
WITNESSES
INVENTOR
Jeremiah Zweighaft
Lawrence Nauman
BY
Macdonald & Macdonald
ATTORNEYS

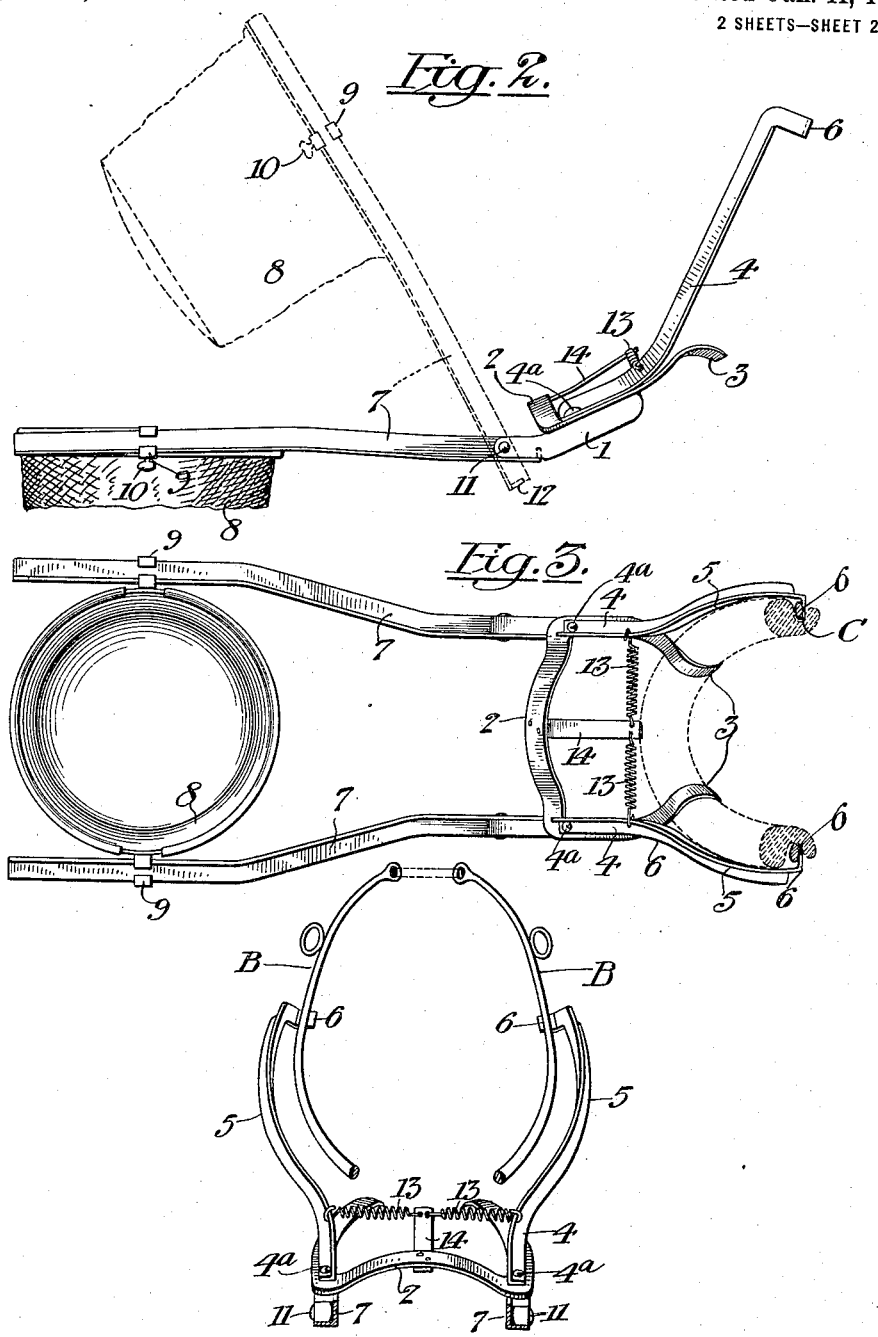

UNITED STATES PATENT OFFICE.

JEREMIAH ZWEIGHAFT AND LAWRENCE NAUMAN, OF CRESCO, PENNSYLVANIA.

FEED-BAG SUPPORT.

1,168,043.    Specification of Letters Patent.    Patented Jan. 11, 1916.

Application filed December 7, 1914. Serial No. 875,790.

*To all whom it may concern:*

Be it known that we, JEREMIAH ZWEIGHAFT and LAWRENCE NAUMAN, citizens of the United States, and residing at Cresco, in the county of Monroe and State of Pennsylvania, have invented certain new and useful Improvements in Feed-Bag Supports, of which the following is a full, clear, and exact specification, such as will enable others skilled in the art to which it appertains to make and use the same.

This invention relates to feed bags for draft animals, and particularly such as are supported by the harness of the animal, (as distinguished from bags suspended upon the head of the animal) with the object of allowing freedom of movement of the animal's head into and from the bag and giving ready access to the contents thereof until the same is entirely consumed. Heretofore, somewhat similar devices have been used but their construction has involved the employment of buckles, straps, clasps, screws and the like, for supporting the bags upon the harness. Such means, however, have been unsatisfactory, since they required a considerable time to place the device in position and remove it therefrom, and generally have been so complicated in their construction as to materially enhance the cost above that of the ordinary bag suspended from the animal's head.

The principal object of the present invention is to simplify both the construction, and manner of application, of a feed bag and support of the character stated and to provide a simple, inexpensive, strong and durable device that may be quickly placed in position and removed therefrom, and which, when not in use, will be compact and occupy very little space.

With these and other objects in view, the invention consists primarily in a carrying member to which the feed bag is directly connected, having a bearing member at the rear end thereof adapted to bear against the collar of the animal and thereby take the major portion of the weight and laterally movable holding members also engaging the collar and carried by said bearing member for holding the latter in operative position, the disposition and point of engagement of the holding members being such as to coöperate with the bearing member to sustain the bag and its carrying member in a substantially horizontal position from the collar.

A further and important feature of the invention resides in the provision of means for automatically moving the holding members to clamping engagement with the collar of the animal and normally tending to hold the same in engagement with the collar.

Provision is also made for adjustably connecting the feed bag to the carrying member so that the bag may be positioned and made readily accessible by the animal.

Other objects and features of the invention consists in the combination and arrangement of parts which will be made clear as the specification proceeds.

It is to be understood, however, that structural variations and modifications may be made without departing from the scope and spirit of the invention, as defined by the appended claims.

In the drawings: Figure 1 is a perspective view of the invention, illustrating the same applied to the collar of the animal. Fig. 2 is a side elevation of the invention, showing the same adapted to be folded as illustrated in dotted lines. Fig. 3 is a plan view of the invention showing the same applied to the collar, the latter being shown as taken on line 3—3 of Fig. 1. Fig. 4 is a front sectional view partly in elevation, taken on line 4—4 of Fig. 1. Fig. 5 is a detail of the manner of fastening the bag to its carrying arms. Fig. 6 is an enlarged detail of the hinged connection between the carrying arms and the bearing member.

Like reference characters denote like parts throughout the specification and drawings.

Referring in detail to the drawings, A denotes a horse collar and B denotes the usual hames seated in the groove C of the collar to which the present invention is applied.

1 designates a pair of spaced and co-extending arms the rear ends thereof projecting at an angle so that the rear portion shall extend slightly upward when the device is applied, as shown in Figs. 1 and 2, and which are held in rigid spaced relation by the bridge member 2 secured to each arm and arranged to extend at substantially right-angles thereto to connect the latter. The opposite ends of the bridge 2 are bent to co-extend, in part, with the arms and continue in a direction rearwardly and inwardly thereof, having their free extremities so formed as to provide the curved lips 3, as clearly shown in the Figs. 1, 2 and 3, to bear against the rounded surfaces of the horse collar A. The parts just described may be termed a bearing member, since together they support the major portion of the weight of the device.

To properly support the device in position, the holding members 4 are provided, being pivoted at one end, as at 4ª, to the bridge member 2. These holding members 4 are curved outwardly as shown at 5, in Figs. 1, 2, 3 and 4 to conform to the contour of the collar A on opposite sides of the neck of the animal and have their free ends formed with the inwardly extending tongues 6, which are adapted to be inserted between the collar A and the hame B, as shown in Figs. 1, 3 and 4.

Extending from and hingedly connected to the front ends of the arms 1 are the spaced and co-extending carrying bars 7, which, as shown in Fig. 1, are adapted to extend in a substantially horizontal plane when the device is placed in operative position. A feed bag 8 of any preferred type is adjustably supported upon and between the spaced carrying bars 7 by means of the clamps 9, secured to the bag 8, and slidably engaging each bar. The clamps 9 are provided with thumb screws 10 for frictionally holding the feed bag in adjusted position on the carrying bars.

The carrying bars 7 and arms 1 are preferably of a light angle iron construction. The arms 1 are pivoted on the studs 11 carried by the upright walls of the bars 7 at a point spaced from the rear ends thereof. The rear extremities of the bars 7 are formed with inwardly extending portions 12 which act as stops for the hinged members 1 and 7, as shown in Fig. 6, and when the device is in operative or opened position they form a rigid connection between the hinged parts.

As clearly shown in the drawings the holding members 4 have a laterally swinging movement and when moved toward each other may be brought into clamping engagement with the collar A, or, as herein illustrated, with the hame of the collar. Means are provided for constantly placing the holding members under tension which tend to move the latter toward each other so as to cause the same to automatically engage the collar A and be held in clamping engagement therewith.

The automatic tension means shown comprises the two contractile springs 13 each connected at one end with one of the holding members 4 and at their opposite ends with the rigid projection 14 secured to the bridge 2 and extending rearwardly therefrom.

From the foregoing, it will be seen that we have provided a feed bag support which is adapted to be sustained in position on the collar of the horse without necessitating or requiring the use of springs, buckles or screws to secure the same to the collar thus facilitating the application of the device. Also that by the provision of the laterally swinging members 4 the device may be applied to horse collars of various types and sizes without requiring adjustment or rearrangement of parts.

When the device is to be placed in operative position, all that is necessary is that the operator shall spread the holding members 4, against the action of the springs 13, when, on releasing said members, the tongues 6 of the holding members will spring into place behind the hames of the collar, at opposite sides of the latter; at the same time the curved lips 3 of the bearing member will be placed upon the inner surface of the collar. Thus adjusted, the bearing member takes substantially the entire weight of the device, and the holding members, automatically act to retain the device in proper position to be thus supported. The device may be readily removed in the reverse order of steps just mentioned and when so removed it may be folded into a relatively compact article. In use, the feed bag will preferably be of collapsible material, so that when the device is folded it may be placed away and will occupy very little space.

What we claim is:

1. A feed-bag support for draft animals, comprising a feed-bag carrying member, a bearing member connected to said carrying member adapted to bear against the collar of the animal for supporting said carrying member thereon, and holding means having operative connection with said bearing member and pivoted for lateral movement to engage said collar, to hold the bearing member in operative position.

2. A feed-bag support for draft animals, comprising a plurality of feed-bag carrying members, a bearing member secured to said carrying members adapted to bear against the collar of the animal for supporting said carrying members thereon, pivoted means mounted on said bearing member and adapted to engage said collar for holding the bearing member in operative position, and tension means connected to said pivoted means for automatically moving the latter into engagement with said collar.

3. A feed-bag support for draft animals, comprising a plurality of feed-bag carrying members, a bearing member, including a plurality of spaced apart bearing arms, connected to said carrying members, adapted to bear against the collar of the animal for supporting said carrying members thereon, said arms being curved to approximately fit an inner surface of the collar, and holding arms connected on said bearing member and adapted to engage said collar, to hold the bearing member in operative position.

4. A feed-bag support for draft animals, comprising a plurality of feed bag carrying members, a bearing member including a plurality of bearing arms secured to said carrying members adapted to bear against the collar of the animal for supporting said carrying members thereon, pivoted means mounted on said bearing member and adapted to engage said collar for holding the bearing member in operative position, and tension means connected to said pivoted means for automatically moving the latter into engagement with said collar.

5. A support for feed bags, comprising a carrying member to which the bag is attached, rigid means connected to said member adapted to loosely bear upon a surface of a horse collar and support a portion of the load thereon, and holding members movable laterally to engage said collar and having operative connection with said bearing means to hold the latter in operative position.

6. A feed-bag support, comprising a carrying member to which the bag is attached, a rigid bearing member connected thereto and adapted to have a part thereof rest loosely upon the inner surface of a horse collar and support a portion of the load thereon, and holding members connected to said bearing member and movable laterally to engage said collar and hold said bearing member in supported position.

7. A feed bag support comprising a carrying member including a pair of spaced-apart bars to which the bag is attached, a bearing member connected to said carrying member adapted to have a part thereof rest loosely against the inner surface of a horse collar provided with hames and thus support a portion of the load, holding members connected to said bearing member and pivoted for lateral movement relative thereto, and means on the free ends of said holding members adapted to abut against the hames of said collar and thus hold said bearing member in supported position.

8. A feed bag support comprising a carrying member including a pair of spaced-apart bars to which the bag is attached, a bearing member connected to said carrying member adapted to have a part thereof rest loosely against the lower inner portion of a horse collar provided with hames and thus take a portion of the load, holding members connected to said bearing member and pivoted thereto for lateral movement relative thereto, means on the free ends of said holding members adapted to abuttingly engage the hames of said collar and hold said bearing member in supported position, and separate means for retaining said holding members in operative engagement with said hames.

JEREMIAH ZWEIGHAFT.
LAWRENCE NAUMAN.

Witnesses:
 M. S. BESUKER,
 THEO WM. LAKE.

Copies of this patent may be obtained for five cents each, by addressing the "Commissioner of Patents, Washington, D. C."